US010040051B2

(12) United States Patent
Weiss et al.

(10) Patent No.: US 10,040,051 B2
(45) Date of Patent: Aug. 7, 2018

(54) INTEGRATED PROCESS TO RECOVER HIGH QUALITY NATIVE $CO_2$ FROM A SOUR GAS COMPRISING $H_2S$ AND $CO_2$

(71) Applicant: TOTAL SA, Courbevoie (FR)

(72) Inventors: Claire Weiss, Vaucresson (FR); Kamlesh Ghodasara, Milan (IT); Bassame Derriche, Dammarie les Lys (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 15/485,881

(22) Filed: Apr. 12, 2017

(65) Prior Publication Data

US 2017/0216812 A1   Aug. 3, 2017

Related U.S. Application Data

(63) Continuation of application No. 14/651,074, filed as application No. PCT/IB2013/002901 on Dec. 10, 2013, now Pat. No. 9,731,974.

(60) Provisional application No. 61/735,301, filed on Dec. 10, 2012, provisional application No. 61/752,174, filed on Jan. 14, 2013.

(51) Int. Cl.
| | | |
|---|---|---|
| *B01J 19/24* | (2006.01) | |
| *B01D 53/75* | (2006.01) | |
| *B01D 53/14* | (2006.01) | |
| *B01D 53/52* | (2006.01) | |
| *C01B 17/04* | (2006.01) | |
| *C10L 3/10* | (2006.01) | |
| *C01B 31/20* | (2006.01) | |

(52) U.S. Cl.
CPC ........ *B01J 19/245* (2013.01); *B01D 53/1462* (2013.01); *B01D 53/1468* (2013.01); *B01D 53/526* (2013.01); *B01D 53/75* (2013.01); *C01B 17/0408* (2013.01); *C01B 17/0447* (2013.01); *C01B 17/0456* (2013.01); *C01B 31/20* (2013.01); *C10L 3/103* (2013.01); *C10L 3/104* (2013.01); *B01D 2252/2023* (2013.01); *B01D 2252/20447* (2013.01); *B01D 2252/20484* (2013.01); *B01D 2252/20489* (2013.01); *B01J 2219/00157* (2013.01); *B01J 2219/24* (2013.01); *C01P 2006/80* (2013.01)

(58) Field of Classification Search
CPC ............ C01B 17/0404; C01B 17/0408; B01D 53/1462; B01D 53/526; B01D 53/75; B01D 53/8618
See application file for complete search history.

(56) References Cited

U.S. PATENT DOCUMENTS

| | | | | |
|---|---|---|---|---|
| 4,406,868 A * | 9/1983 | Carter | ............... | B01D 53/1406 |
| | | | | 423/226 |
| 6,090,356 A | 7/2000 | Jahnke et al. | | |
| 2010/0303700 A1* | 12/2010 | Palla | .................. | B01D 53/1418 |
| | | | | 423/242.1 |
| 2010/0310439 A1 | 12/2010 | Brok et al. | | |
| 2012/0279728 A1 | 11/2012 | Northrop et al. | | |
| 2013/0022534 A1 | 1/2013 | Menzel | | |
| 2015/0191360 A1* | 7/2015 | Weiss | ..................... | B01D 53/75 |
| | | | | 423/437.1 |
| 2015/0307359 A1* | 10/2015 | Weiss | ................. | B01D 53/1462 |
| | | | | 423/437.1 |

FOREIGN PATENT DOCUMENTS

| | | |
|---|---|---|
| DE | 50302133 | 3/2006 |
| EP | 0375077 B1 | 6/1993 |
| EP | 1646442 A1 | 4/2006 |
| WO | WO 2012/089776 A1 | 7/2012 |

OTHER PUBLICATIONS

Application and file history for U.S. Appl. No. 14/651,074, filed Jun. 10, 2015, inventors Weiss et al.
International Search Report for PCT Application PCT/IB2013/002901, dated Sep. 3, 2014, 3 pgs.

* cited by examiner

*Primary Examiner* — Timothy C Vanoy

(74) *Attorney, Agent, or Firm* — Patterson Thuente Pedersen, P.A.

(57) ABSTRACT

The invention concerns a method for treating a hydrocarbon feed gas stream containing at least $CO_2$ and $H_2S$ to recover a high quality purified $CO_2$ gas stream, comprising a. Separating said hydrocarbon feed gas stream into a sweetened hydrocarbon gas stream, and an acid gas stream; b. Introducing said gas stream into a Claus unit, c. Introducing the tail gas into a hydrogenation reactor and then into a quench contactor of the Tail Gas Treatment Unit (TGTU); d. Contacting said tail gas stream with a non-selective amine-based solvent into a non-selective acid gas absorption unit of the TGTU; e. Sending the off gas to an incinerator; f. Contacting said enriched gas stream (vii) with a selective $H_2S$-absorption solvent into a selective $H_2S$-absorption unit thereby recovering a highly purified $CO_2$ gas stream and a $H_2S$-enriched gas stream, as well as the device for carrying said method.

3 Claims, 2 Drawing Sheets

INTEGRATED PROCESS TO RECOVER HIGH QUALITY NATIVE $CO_2$ FROM A SOUR GAS COMPRISING $H_2S$ AND $CO_2$

RELATED APPLICATIONS

The present application is a Continuation of U.S. patent application Ser. No. 14/651,074 filed Jun. 10, 2015 which is a National Phase entry of PCT Application No. PCT/M2013/002901, filed Dec. 10, 2013, which claims priority to U.S. Provisional Application No. 61/735,301, Filed Dec. 10, 2012, and also claims priority to U.S. Provisional Application No. 61/752,174, filed Jan. 14, 2013, said applications being hereby incorporated by reference herein in their entirety.

FIELD OF THE INVENTION

The present invention relates to the removal of sulfur components and carbon dioxide contained in a hydrocarbon feed stream in order to recover the native carbon dioxide in a purified stream. More specifically, the present invention relates to a process for recovering high quality native $CO_2$ from a sour gas which comprises $CO_2$, $H_2S$ and other sulfur contaminants, so that said recovered high quality native $CO_2$ may be then sequestered or used for enhanced oil recovery (EOR). Besides, the present invention concerns an installation for implementing such process.

BACKGROUND OF THE INVENTION

Natural gas or gases associated to oil productions produced from geological reservoirs, or refinery acid gases often contain(s) acid contaminants, such as carbon dioxide and/or hydrogen sulfide and/or other sulfur contaminants, such as carbonyl sulfide, carbon disulfide and mercaptans. For most of the applications of these gas streams, the acid contaminants need to be removed, either partially or almost completely, depending on the application and the type of contaminant.

Methods to remove carbon dioxide and/or hydrogen sulfide and/or other sulfur contaminants from a hydrocarbon gas stream are known in the prior art.

One common approach to remove acid contaminants involves the use of solvents such as chemical solvent (amine-based solvent), hybrid solvent or physical solvent. These solvents have been largely disclosed in the art. However, if appreciable levels of sulfur compounds are present in the acid gas, the most common process to eliminate hydrogen sulfide is to convert said hydrogen sulfide into a non-hazardous by-product such as elemental sulfur. The Claus process is a known type of sulfur recovery process allowing the conversion of hydrogen sulfide into elemental sulfur, by sending it to a sulfur recovery unit (SRU).

In some embodiments, remaining $H_2S$ traces are captured in a Tail Gas Treatment Unit (TGTU), positioned at the outlet of the Claus unit to increase significantly sulfur recovery, and then be recycled into the Claus unit. The TGTU converts small amounts of sulfur compounds (<5%), which were not converted in the sulfur recovery unit (SRU), into hydrogen sulfide ($H_2S$) and recycles it back to the SRU for additional processing. The TGTU is composed of at least four equipments: a hydrogenation reactor, a waste heat exchanger, a quench tower and an acid gas absorption column.

The SRU tail gas is heated and sent to the hydrogenation reactor where essentially all of the sulfur compounds are converted into $H_2S$. The gas from the hydrogenation reactor is cooled in the waste heat exchanger and the quench tower. The cooled gas is then sent to the acid gas absorption column, where amine removes the $H_2S$ and some of the $CO_2$ contained in the gas stream. The $H_2S$ and $CO_2$ removed from the amine is cooled (and water removed) in the overhead condenser and recycled to the sulfur recovery unit for additional processing into sulfur. At the outlet of the TGTU, native $CO_2$ is recovered. It is diluted by a large amount of nitrogen coming from the combustive agent used for Claus combustion. To recover a purified $CO_2$ stream, $CO_2$ capture technologies using solvent (for example an amine solvent, such as MethylEthanolAmine (MEA)) can be used. However, since the $CO_2$ is diluted in a large volume of nitrogen, the amine-based $CO_2$ capture unit requires large size equipments, thereby leading to huge CAPEX and OPEX.

Furthermore, an incinerator is generally connected at the outlet of the amine-based $CO_2$ capture unit in order to incinerate the nitrogen, the hydrogen, the carbon monoxide and the remaining traces of sulfur contaminants.

At the outlet of the amine-based $CO_2$ capture unit a purified stream of native $CO_2$ is recovered, however this $CO_2$ stream contains hydrogen sulfide in such quantities that do not meet certain specifications, and more particularly such purified $CO_2$ cannot be used for enhanced oil recovery (EOR) applications.

Therefore, there is a need for a method that allows recovering high quality native $CO_2$ from a hydrocarbon feed gas stream which contains acidic compounds, such as $CO_2$, $H_2S$ and other sulfur contaminants, with better purity compared with the processes of the prior art.

SUMMARY OF THE INVENTION

Method

An object of the present invention is a method for treating a hydrocarbon feed gas stream containing at least carbon dioxide and hydrogen sulfide to recover a high quality purified $CO_2$ gas stream, said process comprising the following steps:

a. Separating said hydrocarbon feed gas stream into (i) a sweetened hydrocarbon gas stream, and (ii) an acid gas stream comprising at least carbon dioxide and hydrogen sulfide;

b. Introducing said acid gas stream (ii) into a Claus unit, thereby recovering (iii) a liquid stream of elemental sulfur and (iv) a tail gas comprising nitrogen, carbon dioxide, sulfur dioxide and hydrogen sulfide;

c. Introducing the exiting tail gas (iv) into a hydrogenation reactor and then to a quench contactor of a Tail Gas Treatment Unit (TGTU) thereby recovering (v) a hydrogenated tail gas stream comprising nitrogen, hydrogen, carbon monoxide, carbon dioxide and hydrogen sulfide;

d. Contacting said hydrogenated tail gas (v) with a non-selective amine-based solvent into a non-selective acid gas absorption unit of the TGTU thereby recovering (vi) an off gas comprising nitrogen, hydrogen and carbon monoxide and (vii) a gas stream enriched in carbon dioxide and hydrogen sulfide;

e. Sending the off gas (vi) to an incinerator;

f. Contacting said enriched gas stream (vii) with a selective $H_2S$-absorption solvent into a selective $H_2S$-absorption unit thereby recovering (viii) a highly purified $CO_2$ gas stream and (ix) a $H_2S$-enriched gas stream.

In one embodiment, the feed gas stream is separated in step a) into (i) a sweetened hydrocarbon gas stream, and (ii)

an acid gas stream comprising carbon dioxide and hydrogen sulfide. Said separation can be performed by a classical sweetening method using a chemical, a hybrid or a physical solvent.

In one embodiment, the hybrid solvent comprises amine, water and thiodiglycol (TDG). Preferably, the amine is selected from the group comprising DiEthanolAmine (DEA), MethylDiEthanolAmine (MDEA), HydroxyEthylPiperazine (HEP), Piperazine (PZ) and mixtures thereof.

In one embodiment, the non-selective amine-based solvent used in the non-selective acid gas absorption unit of the TGTU is MonoEthanolAmine (MEA).

In one embodiment, the TGTU further comprises a feed inline burner or a tail gas heater. The acid gas absorption unit may be based on amine.

In one embodiment, the selective $H_2S$-absorption solvent used in the selective $H_2S$-absorption unit is MethylDiEthanolAmine (MDEA). Preferably, said selective $H_2S$-absorption solvent is a hybrid solvent comprising an amine, water and thiodiglycol (TDG). Preferably, said amine is selected between DiEthanolAmine (DEA), MethylDiethanolAmine (MDEA), HydroxyEthylPiperazine (HEP) and Piperazine (PZ).

In one embodiment, the H2S-enriched gas stream (ix) recovered at the exit of the selective $H_2S$-absorption unit is recycled upstream of or directly to the Claus unit.

In one embodiment, the $H_2S$-enriched stream may contain at least 25% of hydrogen sulfide, preferably at least 40% of hydrogen sulfide, and more preferably at least 50% of hydrogen sulfide.

In one embodiment, the highly purified $CO_2$ stream obtained by the method of the invention may contain less than 250 ppm of $H_2S$, in particular less than 100 ppm of $H_2S$.

Device

The present invention also relates to a device for carrying out the method as described above, as well as the purified gas stream obtained by the present process.

The device of the present invention comprises in the direction of flow:
 an acid gas removal unit;
 a Claus unit;
 a tail gas treatment unit comprising a hydrogenation reactor, a quench contactor and a non-selective acid gas absorption unit;
 a selective $H_2S$-absorption unit; and
 an incinerator.

In one embodiment, the acid gas removal unit is an amine based solvent.

In one embodiment, the tail gas treatment unit further comprises a feed inline burner or a tail gas heater. The non-selective acid gas absorption unit is based on an amine.

In one embodiment, the non-selective amine-based solvent used in the non-selective acid gas absorption unit of the TGTU is MonoEthanolAmine (MEA).

In one embodiment, the device comprises a line for recycling the H2S-enriched gas stream recovered at the exit of the selective H2S-absorption unit upstream of or directly to the Claus furnace.

In one embodiment the $H_2S$-enriched gas stream may contain at least 10% of hydrogen sulfide, preferably at least 20% of hydrogen sulfide, and more preferably at least 80% of hydrogen sulfide.

DETAILED DESCRIPTION OF THE DRAWINGS

Figure 1:
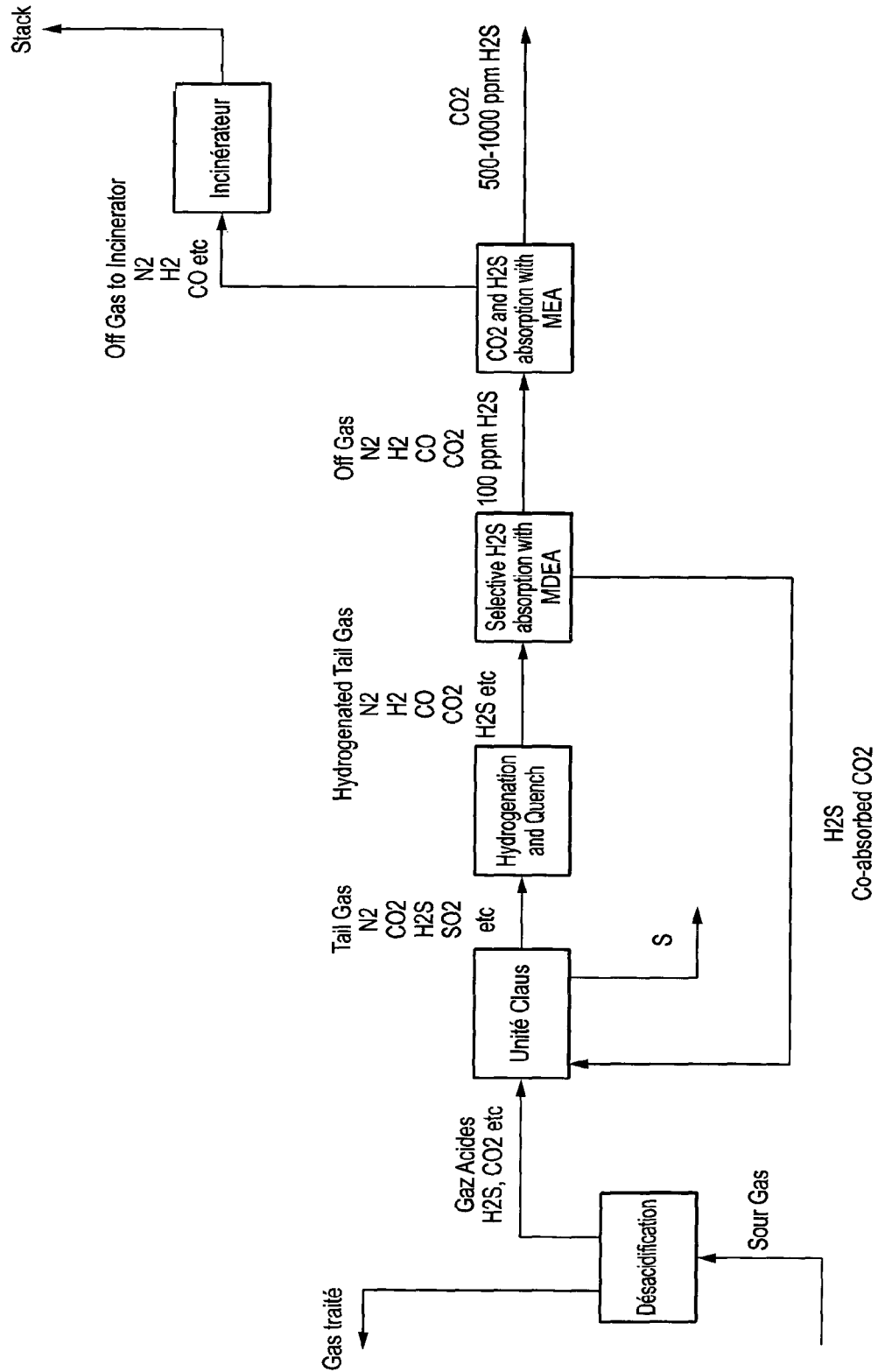
FIG. 1 is a schematic view of a classical CO2 recovery unit, as known in the prior art.

The process according to the invention applies to the treatment of a hydrocarbon feed gas stream containing acid contaminants, such as a natural gas stream. The acid contaminants are mainly composed of carbon dioxide and hydrogen sulfide. However, the gas stream may also contain other acid contaminants, such as mercaptans, and/or carbonyl sulfide, and/or carbon disulfide, etc.

Typically, the hydrocarbon feed gas stream may contain from 5% to 70% of $CO_2$, in particular from 7% to 40% of $CO_2$, more particularly from 10% to 20% of $CO_2$, and from 1% to 40% of $H_2S$, in particular from 2% to 20% of $H_2S$, more particularly from 3% to 10% of $H_2S$.

According to step a) of the method of the invention, the hydrocarbon gas stream is separated into (i) a sweetened hydrocarbon gas stream, and (ii) an acid gas stream comprising at least carbon dioxide and hydrogen sulfide.

By "sweetened hydrocarbon gas stream", it is meant a hydrocarbon gas stream containing less acid contaminants than the hydrocarbon feed gas stream. The acid gas stream (ii), on the other hand, is enriched in acid contaminants compared to the hydrocarbon feed gas stream.

Methods for obtaining a sweetened hydrocarbon gas stream (i) and acid gas stream (ii) from a hydrocarbon feed gas stream containing acid contaminants are well known by the person skilled in the art. Any sweetening method may be used for performing step a) of the present invention. Such methods include cryogenic treatment or solvent treatment, such as chemical, physical or hybrid solvent.

Typically, the acid gas stream (ii) contains from 15% to 75% of $CO_2$, in particular from 30% to 65% of $CO_2$, more particularly from 40% to 60% of $CO_2$, and from 20% to 80% of $H_2S$, in particular from 40% to 70% of $H_2S$, more particularly from 50% to 70% of $H_2S$.

According to step b) of the method of the invention, the acid gas stream (ii) is then introduced into a Claus unit thereby recovering (iii) a liquid stream of elemental sulfur and (iv) a tail gas mainly comprising nitrogen, carbon dioxide, sulfur dioxide and hydrogen sulfide.

A Claus unit allows the conversion of hydrogen sulfide into elemental sulfur according to the following reactions:

$$2\ H_2S + 3\ O_2 \rightarrow 2\ SO_2 + 2\ H_2O \qquad (1)$$

$$2\ H_2S + SO_2 \leftrightarrows 3\ S + 2\ H_2O \qquad (2)$$

According to the invention, the tail gas (iv) recovered at the exit of the Claus unit mostly contains nitrogen, carbon dioxide, sulfur dioxide, hydrogen sulfide and water. Said tail gas (iv) generally contains at least 40% of N2, preferably from 40% to 70% of N2, and at least 10% of CO2, in particular from 10% to 75% of CO2 as main components, and less than 4% of SO2, in particular less than 2% of SO2, and less than 4% of H2S, in particular less than 2% of H2S.

In one embodiment of step c) of the method of the invention, the tail gas (iv) exiting the Claus unit is introduced into a feed inline burner or a tail gas heater before being introduced into the hydrogenation reactor of the Tail Gas Treatment Unit (TGTU) thereby recovering (v) a hydrogenated tail gas stream mainly comprising nitrogen, hydrogen, carbon monoxide, carbon dioxide and hydrogen sulfide.

According to the invention, the hydrogenated tail gas (v) recovered at the exit of the hydrogenation unit mostly contains nitrogen, hydrogen, carbon monoxide, carbon dioxide and hydrogen sulfide. Said tail gas (iv) generally contains at least 20% of $N_2$, preferably from 60% to 90% of $N_2$, and at least 5% of $CO_2$, in particular from 10% to 20% of $CO_2$ as main components, and less than 1.0% of CO, in particular less than 0.5% of CO, and less than 5% of $H_2S$, in particular less than 3% of $H_2S$.

In one embodiment, the TGTU comprises four main equipments in the direction of flow:
a feed inline burner or a tail gas heater for heating the tail gas stream,
a hydrogenation reactor for converting the sulfur compounds of the tail gas stream into $H_2S$,
a quench contactor for removing water from the gas stream and,
a non-selective acid gas absorption unit for separating the acid gases (mainly $CO_2$ and $H_2S$) from the other constituents of the hydrogenated tail gas stream.

The hydrogenation reactor typically comprises a catalytic bed where sulfur compounds such as $SO_2$, S, COS and $CS_2$ are converted into $H_2S$. Furthermore, the feed inline burner or tail gas heater positioned before the input of the hydrogenation reactor heats the tail gas to a temperature suitable for performing the hydrogenation, generally from 130° C. to 240° C., preferably around 225° C. The burner generally operates with air and fuel.

The converted gas stream recovered at the exit of the hydrogenation reactor is then passed through a quench contactor, preferably a water-quench tower, in order to remove all or part of water from the gas stream. The proportion of water removed from the gas stream is at least 60%, preferably at least 70%.

The water saturated gas stream exiting the quench tower is then passed through a non-selective acid gas absorption unit, wherein acidic compounds, mainly $CO_2$ and $H_2S$, are absorbed by a non-selective acid gas absorbing solution. The non-selective acid gas absorption unit is an amine-based unit. A gas stream enriched in carbon dioxide and hydrogen sulfide (vii) is thus recovered from the non-selective acid gas absorption unit, that contains less than 500 ppm of $H_2S$, preferably less than 100 ppm of $H_2S$.

The lean solution containing carbon dioxide and hydrogen sulfide and some other sulfur contaminants, such as carbonyl sulfide, carbon disulfide and mercaptans, is recovered and passed through a stripping column in order to separate the absorbing solution from the acidic contaminants. The absorbing solution is recovered at the bottom of the stripping column and may be recycled to the acid gas absorption unit. A gas stream enriched with sulfur compounds is recovered at the head of the column and may be recycled upstream of or directly in the Claus furnace.

According to step d) of the method of the invention, the hydrogenated tail gas (v) exiting the quench contactor is introduced into a non-selective acid gas absorption unit thereby separating said hydrogenated tail gas into (vi) an off gas mainly comprising nitrogen, hydrogen, and carbon monoxide, and (vii) a gas stream enriched in carbon dioxide and hydrogen sulphide. According to the invention, the off gas (vi) recovered at the exit of the non-selective acid gas absorption unit generally contains at least 70% of $N_2$, preferably from 70% to 80% of $N_2$, and at least 2% of $H_2$, in particular from 2% to 5% of $H_2$, and at least 0.1% of CO, in particular from 0.1% to 1% of CO.

According to the invention, the gas stream (vii) recovered at the exit of the acid gas absorption unit generally contains at least 90% of $CO_2$, preferably from 85% to 97% of $CO_2$, and at least 3% of $H_2S$, in particular from 0% to 10% of $H_2S$.

According to step e) of the method of the invention, the off gas (vi) is sent to an incinerator.

According to step f) of the method of the invention, the enriched gas stream (vii) is introduced into a selective $H_2S$-absorption unit, wherein $H_2S$ is selectively absorbed by a selective $H_2S$-absorption solvent. Preferably, the selective $H_2S$-absorption solvent is an amine-based solvent but any other suitable solvent may be used. More preferably, the amine-based solvent is a MDEA-based solvent.

According to the invention, the highly purified $CO_2$ gas stream (viii) exiting the selective $H_2S$-absorption unit generally contains at least 90% of $CO_2$ (wet basis), preferably from 90% to 97% of $CO_2$, and less than 250 ppm of $H_2S$, in particular less than 100 ppm of $H_2S$.

In one embodiment, the $H_2S$-enriched gas stream (ix) exiting the selective $H_2S$-absorption unit is recycled upstream of or directly to the Claus furnace.

According to the invention, the $H_2S$-enriched gas stream (ix) exiting the selective $H_2S$-absorption unit generally contains at least 15% of $H_2S$, preferably from 15% to 30% of $H_2S$, and less than 80% of $CO_2$, in particular less than 70% of $CO_2$.

Another object of the present invention is a device for carrying the method of the invention as previously described, said device comprising in the direction of flow:
an acid gas removal unit;
a Claus unit;
a tail gas treatment unit comprising a hydrogenation reactor, a quench contactor and a non-selective acid gas absorption unit;
a selective $H_2S$-absorption unit; and
an incinerator.

In one embodiment, the tail gas treatment unit (TGTU) further comprises a feed inline burner or a tail gas heater before the hydrogenation reactor.

The hydrogenation reactor preferably comprises a CoMo catalyst.

The quench contactor may comprise distillation trays or a column packing (random or structured) for direct contact of water.

The non-selective acid gas absorption unit preferably comprises a non-selective amine-based solvent. More preferably the non-selective amine-based solvent used in said non-selective absorption unit is an alcanolamine, in particular MonoEthanolAmine (MEA).

In one embodiment, the device comprises a selective $H_2S$-absorption unit based on a selective $H_2S$-absorption solvent. Preferably, said selective $H_2S$-absorption solvent is an alcanolamine. More preferably, said solvent is MDEA (MethylDiEthanolAmine).

In one embodiment, the device comprises a recycle line for recycling the $H_2S$-enriched gas exiting the selective $H_2S$-absorption unit upstream of or directly into the Claus furnace.

The absorbing units usually comprise a regeneration system for the absorbing solution that comprises a stripping column with a reboiler and reflux drum. The absorbing solution is recovered at the bottom of the stripping column and is recycled into the absorbing unit. A gas stream enriched with acidic compounds is recovered at the head of the column and may be recycled upstream of or directly in the Claus unit. Therefore, the device may further comprise a recycling line for injecting the gas stream enriched with acidic compounds which is recovered at the head of the column upstream of or directly into the Claus unit.

Figure 2:
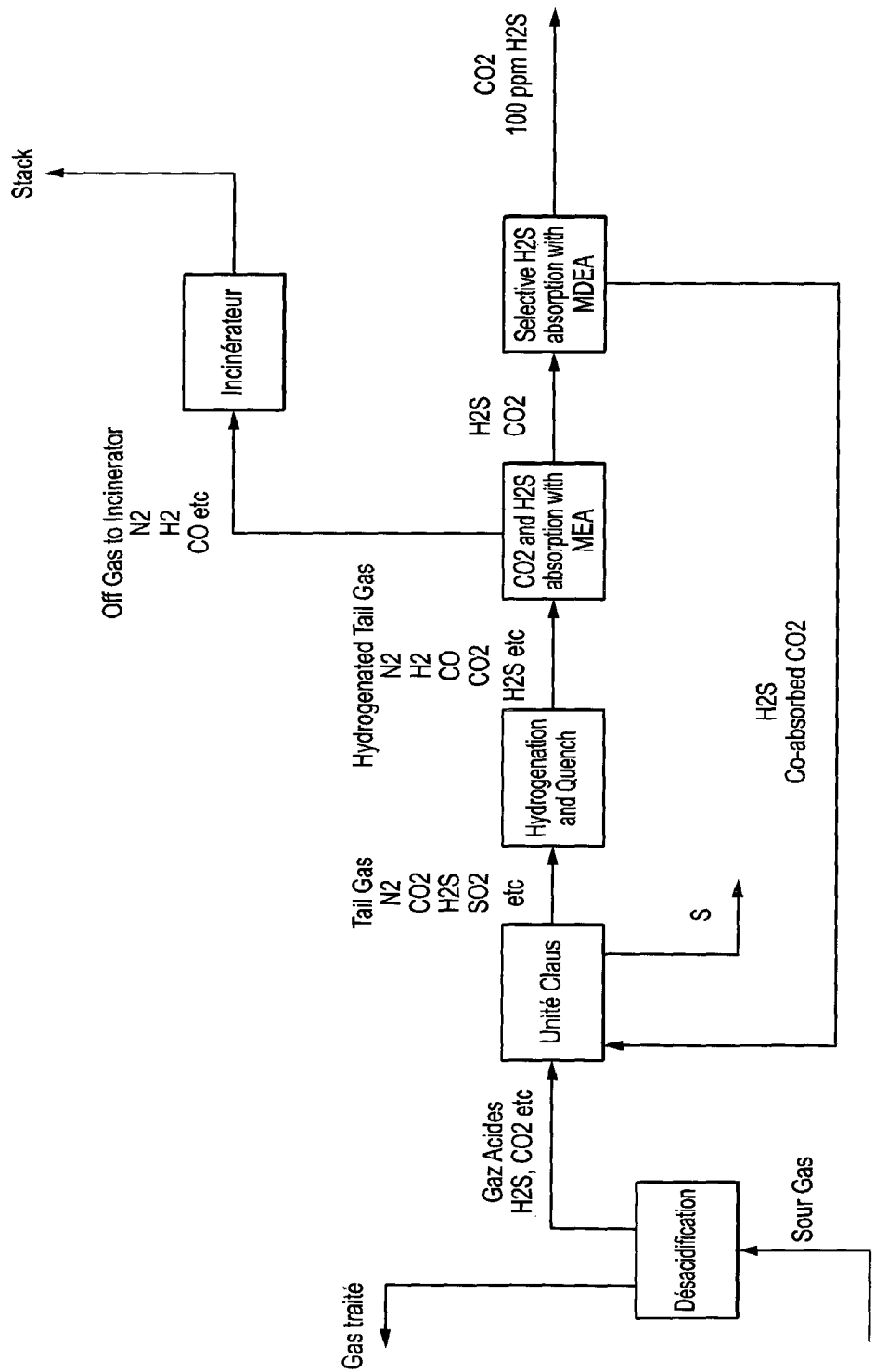
FIG. 2 is a schematic view of the high-quality native CO2 recovery unit for performing the method of the present invention.

The invention is further described in the FIGS. 1 and 2. These examples are offered to illustrate the invention and should in no way be viewed as limiting the invention.

FIG. 1 provides a schematic view of a classical $CO_2$ recovery unit, as known in the prior art. In FIG. 1, a sour gas is introduced into an acid gas removal unit (AGRU), thereby providing a sweet gas and an acid gas containing 50% of carbon dioxide and 50% of hydrogen sulfide. The acid gas then enters a Claus unit at a pressure of 2 bar wherein the hydrogen sulfide is converted into elemental sulfur. Then, the exiting mixture enters the hydrogenation reactor and then the quench contactor of the Tail Gas Treatment Unit (TGTU) to reduce the sulfur compounds leading to a hydrogenated tail gas mixture composed of 80% of nitrogen, 5% of hydrogen, 1% of carbon monoxide and 10% of carbon dioxide. At the outlet of quench contactor, said mixture enters the selective $H_2S$-absorption unit wherein it is contacted with an $H_2S$-selective amine based solvent in order to selectively capture $H_2S$.

Typically, MethylDiEthanolAmine (MDEA) is used as a common $H_2S$-selective amine solvent to capture the $CO_2$ from flue gas. After the step of absorption, the chemical amine solvent enriched in hydrogen sulfide is sent to a regenerator operating at a pressure comprised between 2 bara to recover the amine solvent depleted in acidic compounds (mainly $H_2S$) and to provide a stream which comprises 33% of $H_2S$ and 66% of co-absorbed $CO_2$. Said stream is then recycled to the Claus furnace.

The off gas exiting the selective $H_2S$-absorption step is then introduced into an acid gas absorption unit wherein it is contacted with a non-selective amine-based solvent. Typically, MonoEthanolAmine (MEA) is used as a common non-selective amine-based solvent to capture the acid gases from the off gas. After the step of absorption, the chemical amine solvent enriched in carbon dioxide is sent to a regenerator operating at a pressure comprised between 2 bara to recover the amine solvent depleted in acid gases and to provide a stream which comprises 500 ppm of $H_2S$ and 99.95% of $CO_2$ (dry basis).

The off gas exiting the acid gas absorption unit is then sent to the incinerator.

FIG. 2 provides a schematic view of a high-quality native $CO_2$ recovery unit for performing the method of the present invention.

In FIG. 2, a sour gas is introduced into an acid gas removal unit (AGRU), thereby providing a sweet gas and an acid gas containing 50% of carbon dioxide and 50% of hydrogen sulfide. A classical sweetening method using a chemical, a hybrid or a physical solvent is used as an Acid Gas Removal Unit (AGRU). The acid gas then enters a Claus unit at a pressure of 2 bar wherein the hydrogen sulfide is converted into elemental sulfur. Two streams exit from the Claus unit: a stream of elemental sulfur and a tail gas mainly comprising $N_2$, $CO_2$ and sulfur compounds. Then, the tail gas enters the hydrogenation reactor and then the quench contactor of a Tail Gas Treatment Unit (TGTU) in order to reduce the sulfur compounds present in the tail gas, leading to a hydrogenated tail gas mixture composed of 80% of nitrogen, 5% of hydrogen, 1% of carbon monoxide and 10% of carbon dioxide. At the outlet of quench contactor, said mixture enters the acid gas absorption unit wherein it is contacted with a non-selective amine-based solvent. Typically, MonoEthanolAmine (MEA) is used as a common non-selective amine-based solvent to capture the acid gases from the hydrogenated tail gas. The off gas exiting the acid gas absorption unit is then sent to the incinerator.

The regenerated acid gas from the absorption unit which comprises 5% of $H_2S$ and 95% of $CO_2$ then enters the selective $H_2S$-absorption unit wherein it is contacted with an $H_2S$-selective amine based solvent in order to selectively capture $H_2S$.

Typically, MethylDiEthanolAmine (MDEA) is used as a common $H_2S$-selective amine solvent to capture the H2S from the previously mentioned acid gas mixture. After the step of absorption, the chemical amine solvent enriched in hydrogen sulfide is sent to a regenerator operating at a pressure comprised between 2 bara to recover the amine solvent depleted in acid gases and to provide a stream which comprises 20% of $H_2S$ and 80% of co-absorbed $CO_2$. Said stream is then recycled to the Claus unit.

The treated gas exiting the selective $H_2S$-absorption unit comprises 100 ppm of $H_2S$ and 99.99% of $CO_2$ (dry basis).

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A device for treating a hydrocarbon feed gas stream containing at least carbon dioxide and hydrogen sulfide to recover a purified $CO_2$ gas stream, the device comprising in the direction of flow:
   an acid gas removal unit;
   a Claus unit;
   a tail gas treatment unit for removing sulfur components wherein the tail gas treatment unit comprises a hydrogenation reactor for converting sulfur compounds of the tail gas stream into $H_2S$, a quench contactor for removing water from the gas stream and a non-selective acid gas absorption unit which comprises an amine based solvent for separating carbon dioxide and hydrogen sulfide from the other constituents of the tail gas stream, said amine-based solvent adsorbing both carbon dioxide and hydrogen sulfide;
   a selective $H_2S$-absorption unit; and
   an incinerator connected at an outlet of the non-selective acid gas absorption unit for incinerating the off gas exiting the non-selective acid gas absorption unit.

2. The device according to claim 1, wherein the tail gas treatment unit further comprises a feed inline burner or a tail gas heater before the hydrogenation reactor.

3. The device according to claim 1, wherein the selective $H_2S$-absorption unit comprises a recycle line for recycling the H2S-enriched gas stream upstream of or directly to the Claus furnace.

* * * * *

UNITED STATES PATENT AND TRADEMARK OFFICE
CERTIFICATE OF CORRECTION

PATENT NO.         : 10,040,051 B2
APPLICATION NO.    : 15/485881
DATED              : August 7, 2018
INVENTOR(S)        : Weiss et al.

Page 1 of 1

It is certified that error appears in the above-identified patent and that said Letters Patent is hereby corrected as shown below:

In the Claims

Column 8, Line 62:
Delete "H2S" and insert --$H_2S$--

Signed and Sealed this
Second Day of October, 2018

Andrei Iancu
*Director of the United States Patent and Trademark Office*